(12) United States Patent
Kotze

(10) Patent No.: US 8,245,836 B2
(45) Date of Patent: Aug. 21, 2012

(54) CONVEYOR BELT SCRAPER

(75) Inventor: Johannes Rohm Kotze, Witbank (ZA)

(73) Assignee: Martin Bulk Handling Solutions (Pty) Limited, Witbank, Mpumalanga (ZA)

( * ) Notice: Subject to any disclaimer, the term of this patent is extended or adjusted under 35 U.S.C. 154(b) by 0 days.

(21) Appl. No.: 13/063,007

(22) PCT Filed: Sep. 7, 2009

(86) PCT No.: PCT/IB2009/053884
§ 371 (c)(1),
(2), (4) Date: Mar. 9, 2011

(87) PCT Pub. No.: WO2010/029482
PCT Pub. Date: Mar. 18, 2010

(65) Prior Publication Data
US 2011/0192705 A1    Aug. 11, 2011

(30) Foreign Application Priority Data
Sep. 9, 2008    (ZA) .................................. 2008/07760

(51) Int. Cl.
*B65G 45/16* (2006.01)
(52) U.S. Cl. ....................................................... 198/499
(58) Field of Classification Search .................. 198/497, 198/499
See application file for complete search history.

(56) References Cited

U.S. PATENT DOCUMENTS

| | | | |
|---|---|---|---|
| 4,825,996 A | 5/1989 | Davidts | |
| 5,011,002 A * | 4/1991 | Gibbs | 198/497 |
| 5,301,797 A * | 4/1994 | Hollyfield et al. | 198/499 |
| 6,182,816 B1 * | 2/2001 | Gibbs et al. | 198/497 |
| 6,296,105 B1 | 10/2001 | Carnes | |
| 6,315,105 B1 | 11/2001 | Gibbs | |
| 6,457,575 B2 * | 10/2002 | Swinderman | 198/499 |
| 6,581,754 B2 * | 6/2003 | Law | 198/499 |
| 7,308,980 B2 * | 12/2007 | Peterson et al. | 198/497 |
| 7,424,945 B2 | 9/2008 | Swinderman | |

FOREIGN PATENT DOCUMENTS

| | | |
|---|---|---|
| EP | 0252188 | 1/1988 |
| WO | 2007043944 | 4/2007 |
| WO | 2010/029482 A1 | 3/2010 |

OTHER PUBLICATIONS

Product Brochure of Montering Flexus 2 9750, Vendig AB, 2008, 2 pages.
Product Catalog, Flexus 2 9750, Vendig, 2008-2009, 1 page.

* cited by examiner

*Primary Examiner* — James R Bidwell
(74) *Attorney, Agent, or Firm* — Thompson Coburn LLP; Clyde L. Smith

(57) ABSTRACT

A belt scraper (10) includes a blade mount (12) of a stiff resiliency flexible material to which a scraper blade (16) can be mounted or is mounted. The blade mount (12) has a front (18), a rear (20) and two sides (22) and defines at least one securing passage (24) extending transversely through the blade mount (12) through the sides (22) of the blade mount (12) for receiving a securing member to secure the blade mount (12) to a carrier of a belt cleaner.

13 Claims, 5 Drawing Sheets

CONVEYOR BELT SCRAPER

CROSS-REFERENCE TO RELATED APPLICATIONS

This application is a National Stage application of International Patent Application No. PCT/IB2009/053884, filed Sep. 7, 2009 and incorporated herein by reference in its entirety, which claims the benefit under 35 U.S.C. §119(e) of South African Patent Application No. 2008/07760 filed Sep. 9, 2008 which is incorporated herein by reference in its entirety.

This invention relates to a belt scraper, to a carrier for a belt scraper and to a belt cleaner.

According to one aspect of the invention, there is provided a belt scraper which includes a blade mount of a stiff resiliently flexible material to which a scraper blade can be mounted or is mounted, the blade mount having a front, a rear and two sides and defining at least one securing passage extending transversely through the blade mount through the sides of the blade mount for receiving a securing member to secure the blade mount to a carrier of a belt cleaner.

The blade mount may be of a natural rubber material or a synthetic plastics or polymeric material. Typically, the material of the blade mount has a Shore A hardness of between 60 and 90, more typically between 65 and 85, most typically between 70 and 85.

Typically, the belt scraper includes a mounting base secured to the blade mount, the mounting base being configured to be mounted to a carrier of a belt cleaner. The mounting base may be of a metal, e.g. steel and may be bonded to the blade mount, e.g. adhesively or heat bonded. The blade mount may cover major outwardly facing surfaces of the mounting base, thereby advantageously increasing the bonding area between the blade mount and the mounting base.

The blade mount may define at least one locating formation in or on a bottom or side thereof to cooperate with a locating formation of a carrier of a belt cleaner. In one embodiment of the invention, the locating formation is in the form of a locating recess in the bottom of the blade mount. The mounting base may define an aperture in alignment with the locating recess of the blade mount through which a locating formation of a carrier can be inserted into the locating recess of the blade mount.

In another embodiment of the invention, the blade mount defines a pair of transversely spaced locating formations. The transversely spaced locating formations may be defined as recesses in the sides of the blade mount, the recesses each having an open bottom to receive a locating formation of a carrier. The mounting base in this embodiment may thus also define apertures or cut-outs in alignment with the transversely spaced locating formations through which locating formations of a carrier can be inserted into the transversely spaced locating recesses of the blade mount.

The securing passage through the blade mount may pass through or may be interrupted by the at least one locating recess in the blade mount. Advantageously, this allows a securing member or rod which in use extends through the blade mount to pass through an aperture or passage in a locating formation of a carrier of a belt scraper, thereby to secure the belt scraper to the carrier, or to assist with securing the belt scraper to the carrier.

The blade mount may define, in addition to the securing passage, an elongate slot therethrough which extends transversely through the blade mount through the sides of the blade mount. The slot may be slanted so that a lower end of the slot, i.e. an end further from where a scraper blade is mounted or to be mounted, is closer to one of the front and the rear of the blade mount and an upper end of the elongate slot, i.e. an end nearer to where a scraper blade is mounted or to be mounted, is closer to the other of the rear and the front of the blade mount. In use, the elongate slot may receive a stiffness adjustment member or rod used to adjust the stiffness of the blade mount.

At least one of the front and the rear of the blade mount may define a flex recess extending transversely between the sides of the blade mount, to facilitate flexing of the blade mount when a belt in use passes over the belt scraper. In one embodiment of the invention, the flex recess is defined by or in the rear of the blade mount.

The belt scraper may have a width which is a fraction of a standard conveyor belt width so that the quotient of the standard conveyor belt width divided by the width of the belt scraper is a positive integer greater than 0, e.g. 4. In one embodiment of the invention, the belt scraper has a width of about 150 mm so that four of the belt scrapers can be used with a standard 600 mm wide conveyor belt.

According to a second aspect of the invention, there is provide a carrier for a belt cleaner, the carrier including an elongate base and a plurality of longitudinally spaced locating formations on the base for cooperating with belt scrapers to secure the belt scrapers to the base, the locating formations each defining an aperture to receive a securing member to secure the belt scrapers to the carrier.

In one embodiment of the carrier of the invention, the locating formations are equidistantly spaced. In another embodiment of the carrier of the invention, the locating formations are grouped in pairs, with the locating formations of each pair being spaced a first distance, each pair being spaced from adjacent pairs by a second distance which is smaller than the first distance.

The base may in the form of a tube, e.g. a square tube.

The carrier may include member receivers on the base to receive ends of a securing member used to secure the belt scrapers to the carrier and/or ends of a stiffness adjustment member used to adjust the stiffness of belt scrapers secured to the carrier.

Each member receiver may include a flange defining a plurality of apertures through which ends of members can be received. At least some of the apertures may be arranged along a line, which may be linear or curved, which extends away from the base so that a member can be positioned closer or further away from the base, typically parallel to the base.

Each member receiver may include a saddle configured to fit over the base. The flange may be connected to the saddle and may project upwardly away from the saddle and the base. Each member receiver may define two opposed downwardly depending side skirts, the side skirts projecting below the base. In one embodiment of the invention, the side skirts are apertured, allowing a threaded fastener arrangement, e.g. a bolt and nut arrangement, to be inserted through the apertures in the side skirts thereby to clamp the member receiver by means of the side skirts to the base in a desired location along the length of the base. The side skirts may form part of the saddles.

The invention extends to a belt cleaner which includes a carrier and at least one belt scraper as hereinbefore described mounted to the carrier by a securing member extending through the blade mount of the belt scraper.

The carrier may be as hereinbefore described.

The belt cleaner may include a stiffness adjustment member extending through the elongate slot of the blade mount. Ends of the stiffness adjustment member may be held in the apertures in the flanges of the member receivers.

The belt cleaner may include adjustable carrier mounts at each end of the carrier to secure the belt cleaner in contact with a belt so that the force with which the belt cleaner bears against the belt is adjustable. The adjustable mounts may each include a biased locking member which can be displaced from a biased lock position to an unlock position relative to a locking seat, allowing the carrier to be displaced towards or away from the belt when the locking members are in their unlock positions. Advantageously, the configuration of the adjustable carrier mounts may allow positioning of the belt cleaner in contact with a belt in such a manner that no hand or mechanical tools are required to perform removal, installation or adjustment of the carrier.

The invention will now be described, by way of example, with reference to the accompanying diagrammatic drawings in which FIG. 1 shows a three-dimensional view of a belt scraper in accordance with the invention;

Figure 1:
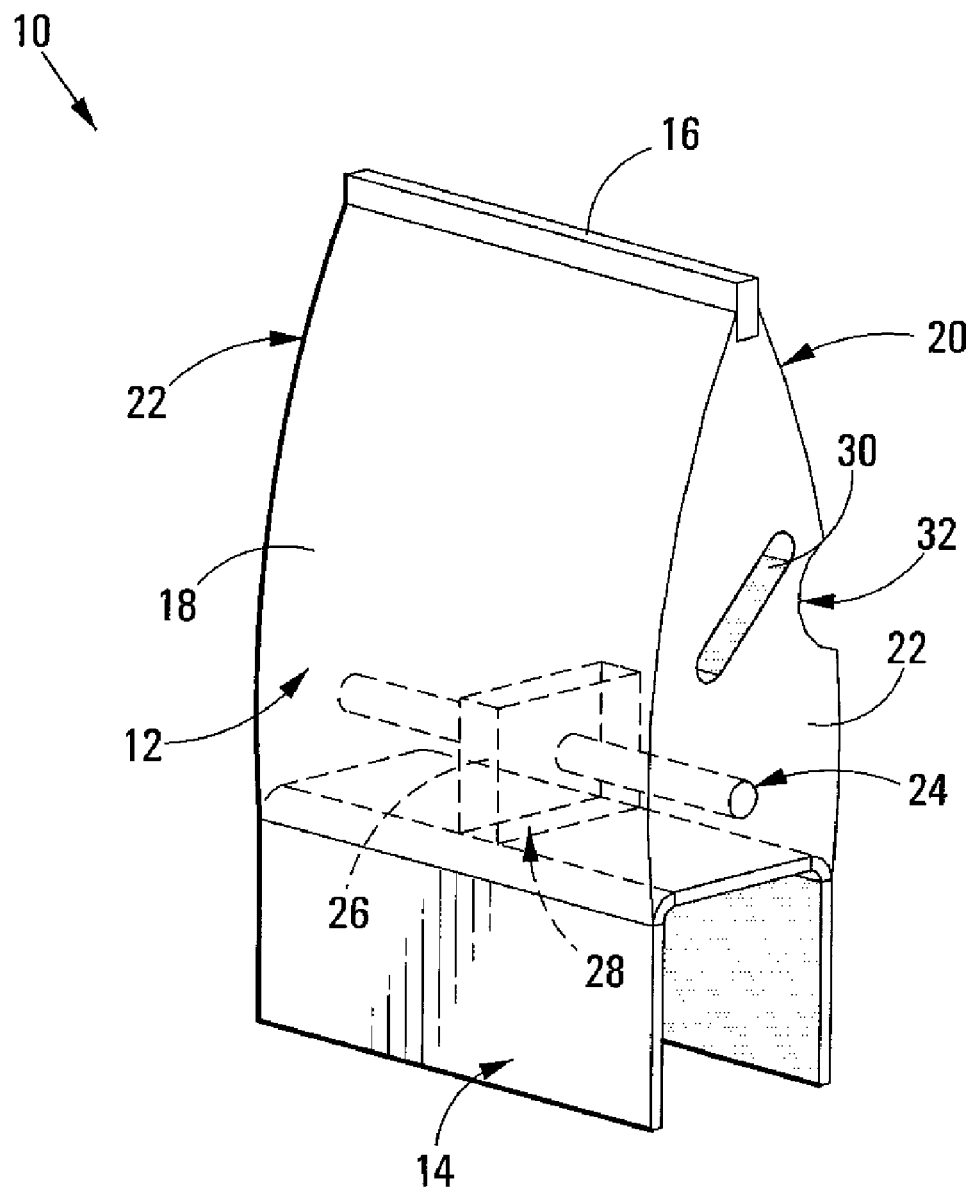

Referring to the drawings, reference numeral 10 generally indicates a belt scraper in accordance with the invention for use with a carrier 50 to form part of a belt cleaner 100.

The belt scraper 10 includes a blade mount 12 of stiff resiliently flexible rubber bonded to an inverted u-shaped steel mounting base 14.

A scraper blade 16 is mounted to an upper end of the blade mount 12. Typically, the scraper blade 16 comprises a tungsten carbide blade or a polyethylene blade.

The blade mount 12 has a front 18, a rear 20 and two opposed sides 22. A securing passage 24 extends transversely through the blade mount 12, through the sides 22. The transverse dimension of the blade mount 12 is also the longitudinal dimension of the blade mount 12, the maximum width of the blade mount 12 between the front 18 and the rear 20 typically being less than the maximum length or distance between the sides 22, using a rectangular Cartesian coordinate system to take the dimensions. Typically, the total height of the blade mount 12 is greater than its maximum length or dimension between the sides 22.

The blade mount 12 defines a locating recess 26 in a bottom thereof. The mounting base 14 defines an aperture 28 which is in alignment with the locating recess 26. The securing passage 24 opens out into the locating recess 26.

An elongate slot 30 also extends transversely through the blade mount 12 between the sides 22 thereof. The elongate slot 30 is slanted as can be clearly seen in FIG. 1 of the drawings. A lower end of the elongate slot 30 is thus closer to the front 18 and the bottom of the blade mount 12 whereas an upper end of the elongate slot 30 is closer to the rear 20 and the scraper blade 16.

An elongate flex recess 32 extends transversely between the sides 22 of the blade mount 12, in the rear 20 of the blade mount 12.

The belt scraper 10 has a width of about 150 mm.

Figure 2:
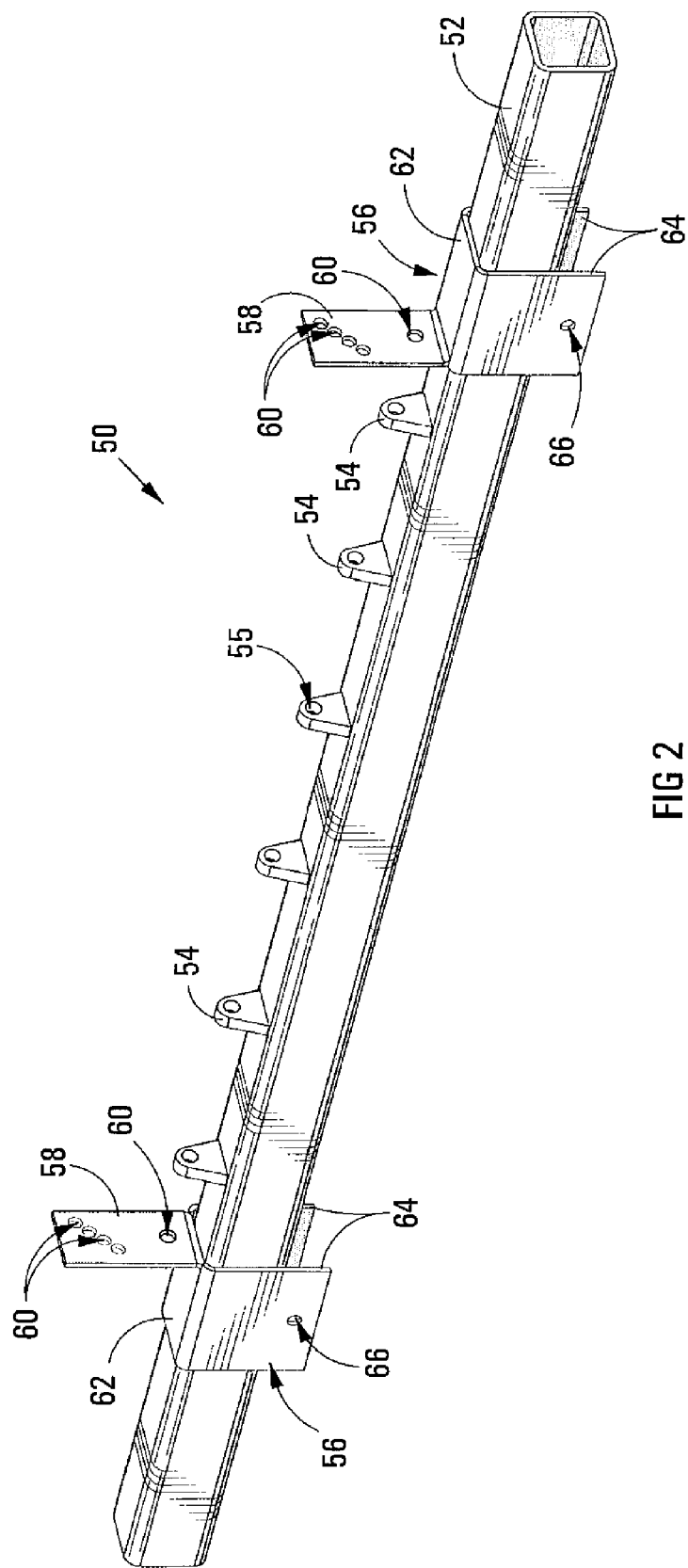
FIG. 2 shows a three-dimensional view of a carrier of a belt cleaner in accordance with the invention.

Referring to FIG. 2 of the drawings, the carrier 50 includes an elongate base 52 in the form of a length of square steel tubing. A plurality of roughly triangular locating formations 54 are equidistantly spaced along the length of the base 52, with end portions of the base 52 being clear of locating formations 54. The locating formations 54 are welded to the square tubing and each locating formation 54 has a rounded apex. Each locating formation 54 defines an aperture 55 extending therethrough. The apertures 55 of the locating formations 54 are in alignment and an imaginary linear line passing through the apertures 55 in the locating formations 54 is parallel to the base 52.

Rod receivers 56 are provided on the end portions of the base 52. Each rod receiver 56 includes a flange 58 defining a plurality of apertures 60 through which ends of rods can be received.

Each rod receiver 56 includes a saddle 62 having opposed downwardly depending side skirts 64. The side skirts 64 project below the base 52 and aligned apertures 66 are provided in the opposed side skirts 64 (only one aperture 66 being visible in respect of each rod receiver 56 in FIG. 2). A threaded fastener arrangement such as a bolt and nut arrangement can be inserted through the apertures 66 and tightened, thereby to clamp the rod receivers 56 to the base 52, at a desired position along the length of the base 52. As will thus be appreciated, the carrier 50 can be used as part of a belt cleaner to clean belts of different widths, as the width of the belt cleaner is adjustable inter alia as a result of the adjustability of the position of the rod receivers 56. In this regard, it is to be noted that the rod receivers 56 have a dimension parallel to the length dimension of the base 52 which is shorter than the spacing between the locating formations 54, allowing the rod receivers 56 also t be positioned between locating formations 54, if desired.

Figure 3:
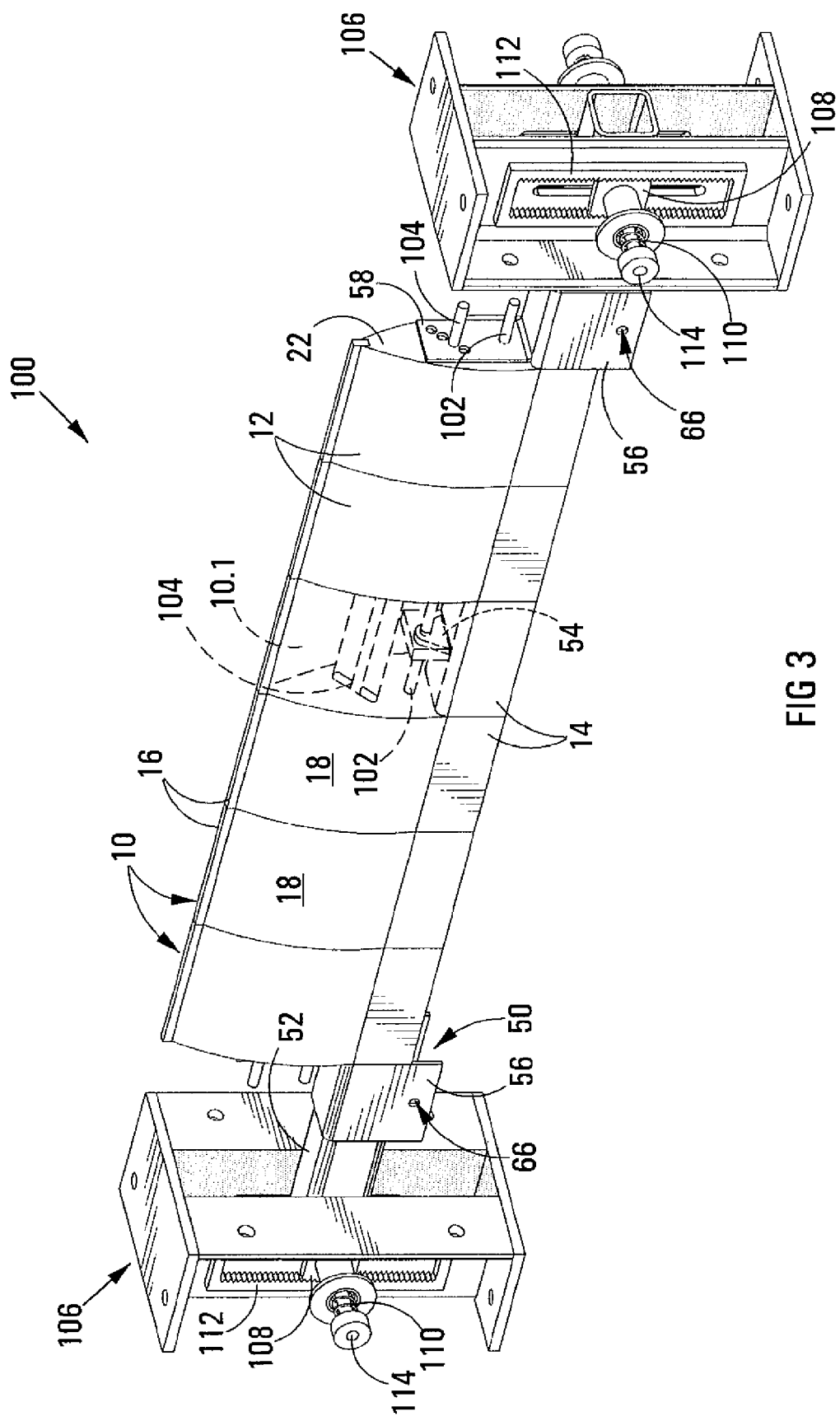
FIG. 3 shows a three-dimensional view of a belt cleaner in accordance with the invention which includes the carrier of FIG. 2 and a plurality of the belt scrapers of FIG. 1.

Referring to FIG. 3 of the drawings, the belt cleaner 100 includes the carrier 50 and a plurality of the belt scrapers 10 mounted to the carrier 50. The belt scrapers 10 are mounted over the locating formations 54 on the base 52 so that the locating formations 54 are received in the locating recesses 26 of the belt scrapers 10, as can be clearly seen in the transparent belt scraper 10.1 shown in FIG. 3. A securing rod 102 passes through one of the apertures 60 in each of the flanges 58 and through the passage 24 through each blade mount 12. In addition, the securing rod 102 passes through the apertures 55 in each of the locating formations 54. The securing rod 102 thus securely attaches the belt scrapers 10 to the base 52, with the mounting bases 14 of the belt scrapers 10 being seated over the base 52.

A stiffness adjustment rod 104 passes through selected aligned apertures 60 in the flanges 58 and through the elongate slots 30 of the blade mounts 12. If it is desirable to increase the stiffness of the blade mounts 12, the adjustment rod 104 is positioned in higher apertures 60, i.e. closer to the scraper blade 16 and the rear 20 of the blade mounts 12. If it is desired to reduce the stiffness of the blade mounts 12, the stiffness adjustment rod 104 is positioned through apertures 60 in the flanges 58 closer to the front 18 and the bottom of the blade mounts 12.

The belt cleaner 100 includes adjustable carrier mounts 106 at each end of the carrier 50, i.e. at each end of the base 52. Each carrier mount 106 includes a pair of opposed locking members 108 with serrated edges held by a spring 110 in a lock position in contact with a serrated locking seat 112. The locking members 108 are located over a shaft 114 which passes through the base 52. If it is desired to adjust a height of the carrier 50, in other words to adjust the force with which the belt scrapers 10 bear against a belt, the locking members 108 are pulled away from their associated locking seats 112 against the load of the springs 110, the carrier 50 is then positioned in a desired position relative to the carrier mounts 106 and the locking members 108 are released to re-engage the locking seats 112 under force of the springs 110.

Figure 4:
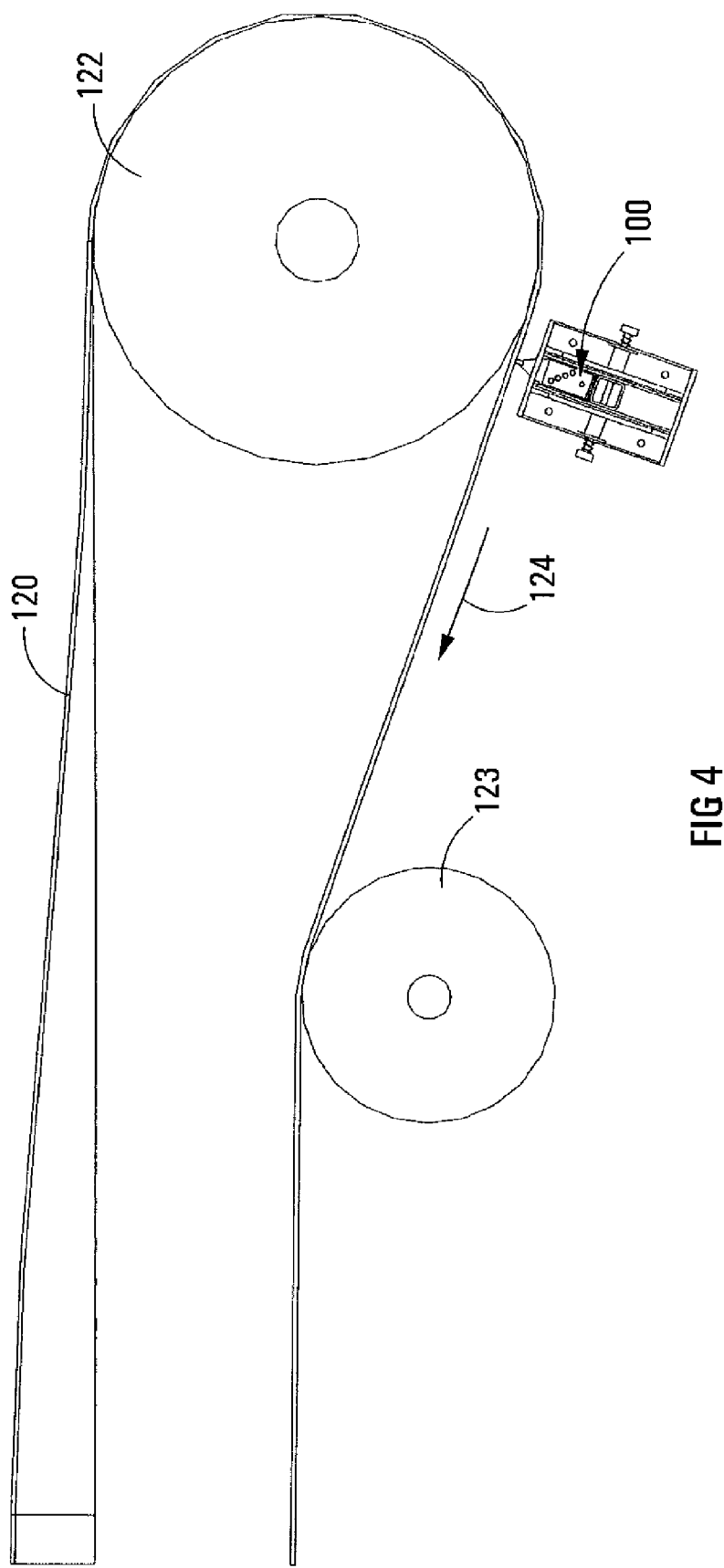
FIG. 4 shows a side view of a conveyor belt installation which employs the belt cleaner of FIG. 3.

The belt cleaner 100 is used in conventional fashion to scrape a belt surface clean, as shown in FIG. 4 of the drawings. The normal direction of travel of a belt 120 around and over pulleys 122, 123 is shown by an arrow 124.

Figure 5:
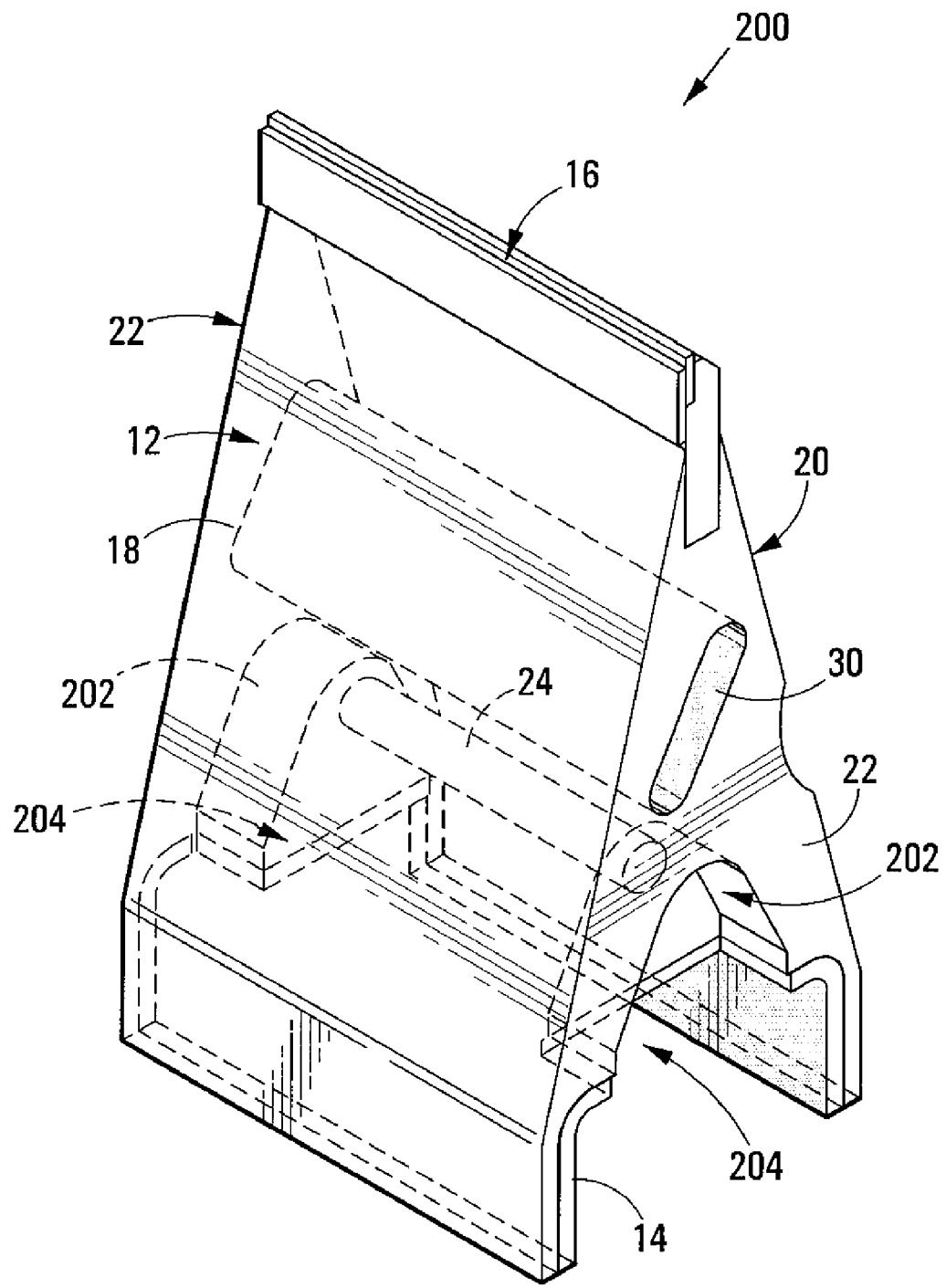
FIG. 5 shows a three-dimensional view of another embodiment of a belt scraper in accordance with the invention.

Referring to FIG. 5 of the drawings, reference numeral 200 generally indicates another embodiment of a belt scraper in accordance with the invention. The belt scraper 200 in many respects is similar to the belt scraper 10 and unless otherwise indicated, the same reference numerals are used to indicate the same or similar parts or features.

The blade mount 12 extends downwardly over the steel mounting base 14, increasing the bonding area between the blade mount 12 and the mounting base 14. A uniform external rubber face on the front 18 and rear 20 of the blade mount 12 also provides a smooth profile for material spilled onto the belt scraper 200 to run off.

Instead of a locating recess 26 in the bottom of the blade mount 12, the blade mount 12 of the belt scraper 200 defines a pair of transversely spaced open-bottomed open-faced locating recesses 202. The locating recesses 202 are roughly triangular in shape with rounded apexes. The securing passage 24 extends transversely through the blade mount 12, opening out in the locating recesses 202, in an upper portion or halve of each locating recess 202. As is clearly visible in FIG. 5, the mounting base 14 defines spaced cut-outs 204 in alignment with the locating recesses 202, for receiving apertured locating formations of a carrier into the locating recesses 202. In this embodiment of the invention, the blade mount 12 will thus in use straddle a pair of spaced locating formations of a carrier, with a lower portion of the blade mount 12 being sandwiched between the spaced locating formations received in the locating recesses 202.

The belt scrapers 10, 200 of the invention, as illustrated, are easily mounted or secured to the carrier 50 or a similar carrier by means of a single securing rod 102. Advantageously, the stiffness adjustment rod 104 can be used to adjust the stiffness of the blade mounts 12, as illustrated, by various degrees of tension or stiffness as required to improve cleaning efficiency depending on conveyor belt type, material conveyed, and other factors such as belt speed and positioning of the belt cleaner 100 relative to the head pulley 122 of the conveyor belt. The slanted elongate slot 30 facilitates downward and backward movement of cleaning edges of the scraper blades 16 under the weight of the conveyor belt 120 thereby reducing the risk of damage to the conveyor belt or joints in the conveyor belt, whether mechanical or spliced, and provides a means for adjusting the stiffness of the blade mount 12. The carrier mounts 106 allow adjustment of the belt cleaner 100 without the need to use hand or mechanical tools. If desired, the base 52 can be provided with guide rollers to ensure that a cleaning edge defined by the belt scrapers 10 remains central to the conveyor belt 120 in the event of miss-tracking.

The invention claimed is:

1. A belt scraper which includes a blade mount of a stiff resiliently flexible material to which a scraper blade can be mounted or is mounted, the blade mount having a front, a rear and two sides and defining at least one securing passage extending transversely through the blade mount through the sides of the blade mount for receiving a securing member to secure the blade mount to a carrier of a belt cleaner, the blade mount defining, in addition to the securing passage, an elongate slot therethrough which extends transversely through the blade mount through the sides of the blade mount, the slot being slanted so that a lower end of the slot is closer to one of the front and the rear of the blade mount and an upper end of the elongate slot is closer to the other of the rear and the front of the blade mount.

2. The belt scraper according to claim 1, in which the blade mount is predominantly of a natural rubber material or a synthetic plastics or polymeric material, and/or in which the belt scraper includes a mounting base secured to the blade mount, the mounting base being configured to be mounted to a carrier of a belt cleaner.

3. The belt scraper according to claim 1, in which the blade mount defines at least one locating formation in or on a bottom or side thereof to cooperate with a locating formation of a carrier of a belt cleaner.

4. The belt scraper according to claim 3, in which the locating formation of the blade mount is in the form of a recess in the bottom of the blade mount and in which the securing passage through the blade mount passes through or is interrupted by the locating recess in the bottom of the blade mount, and/or in which the blade mount defines a pair of transversely spaced locating formations, the transversely spaced locating formations being defined as recesses in the sides of the blade mount, the recesses each having an open bottom to receive a locating formation of a carrier of a belt cleaner.

5. The belt scraper according to claim 1, in which at least one of the front and the rear of the blade mount defines a flex recess extending transversely between the sides of the blade mount, to facilitate flexing of the blade mount when a belt in use passes over the belt scraper.

6. A belt cleaner which includes a carrier and at least one belt scraper as claimed in claim 1, secured to the carrier by a securing member extending through the blade mount of the belt scraper.

7. The belt cleaner according to claim 6, in which the carrier includes an elongate base and a plurality of longitudinally spaced locating formations on the base for cooperating with belt scrapers to secure the belt scrapers to the base, the locating formations each defining an aperture to receive a securing member to secure the belt scrapers to the carrier.

8. The belt cleaner according to claim 6, which includes adjustable carrier mounts at each end of the carrier to secure the belt cleaner in contact with a belt so that the force with which the belt cleaner bears against the belt is adjustable, the adjustable mounts each including a biased locking member which can be displaced from a biased lock position to an unlock position relative to a locking seat, allowing the carrier to be displaced towards or away from the belt when the locking members are in their unlock positions.

9. The belt scraper according to claim 1 wherein the belt cleaner includes a stiffness adjustment member extending through the elongate slot of the blade mount.

10. A carrier for a belt cleaner, the carrier including an elongate base and a plurality of longitudinally spaced locating formations on the base for cooperating with belt scrapers to secure the belt scrapers to the base, the locating formations each defining an aperture to receive a securing member to secure the belt scrapers to the carrier, the carrier also comprising member receivers on the base to receive ends of a securing member used to secure the belt scrapers to the carrier and/or ends of a stiffness adjustment member used to adjust the stiffness of belt scrapers secured to the carrier.

11. A carrier according to claim 10, in which the locating formations are equidistantly spaced.

12. The carrier according to claim 10, in which each member receiver includes a flange defining a plurality of apertures through which ends of members can be received, at least some of the apertures being arranged along a line which extends away from the base so that a member can be positioned closer or further away from the base, parallel to the base.

13. The carrier according to claim 10, in which each member receiver includes a saddle configured to fit over the base, and in which each member receiver defines two opposed downwardly depending side skirts, the side skirts projecting below the base, the side skirts being apertured, allowing a threaded fastener arrangement to be inserted through the apertures in the side skirts thereby to clamp the member receiver by means of the side skirts to the base in a desired location along the length of the base.

* * * * *